United States Patent
Cheon

(10) Patent No.: US 11,968,065 B1
(45) Date of Patent: Apr. 23, 2024

(54) METHODS AND APPARATUS FOR RECEIVING A USER MESSAGE IN A COMMUNICATION NETWORK

(71) Applicant: Marvell Asia Pte, Ltd., Singapore (SG)

(72) Inventor: Hyun Soo Cheon, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 113 days.

(21) Appl. No.: 17/326,092

(22) Filed: May 20, 2021

Related U.S. Application Data

(60) Provisional application No. 63/027,832, filed on May 20, 2020.

(51) Int. Cl.
*H04L 27/233* (2006.01)
*H04B 1/10* (2006.01)

(52) U.S. Cl.
CPC ........ *H04L 27/2338* (2013.01); *H04B 1/1018* (2013.01)

(58) Field of Classification Search
CPC ...... H04B 1/10; H04B 1/1018; H04B 1/1027; H04B 1/1081; H04B 1/16; H04B 1/38; H04B 1/40; H04L 25/0202; H04L 25/0204; H04L 25/0262; H04L 25/03006; H04L 25/03159; H04L 27/14; H04L 27/144; H04L 27/2331; H04L 27/2338; H04L 27/256; H04L 27/25624; H04W 72/0833
USPC ....... 375/260, 262, 340, 341, 346, 348–350; 370/210, 347
See application file for complete search history.

(56) References Cited

U.S. PATENT DOCUMENTS

| | | | | |
|---|---|---|---|---|
| 9,025,691 | B1 * | 5/2015 | Wu | ................... H04L 25/03159 375/267 |
| 2012/0149428 | A1 * | 6/2012 | Yang | ................ H04W 56/0045 455/524 |
| 2016/0035226 | A1 * | 2/2016 | Kejik | ........................ H04L 1/22 342/40 |
| 2018/0288683 | A1 * | 10/2018 | Bendlin | ................ H04W 48/14 |
| 2021/0153120 | A1 * | 5/2021 | Atungsiri | .......... H04W 52/0219 |
| 2021/0410191 | A1 * | 12/2021 | Wu | ................... H04W 74/0833 |

* cited by examiner

*Primary Examiner* — Young T. Tse
(74) *Attorney, Agent, or Firm* — JW Law Group; James M. Wu

(57) ABSTRACT

Methods and apparatus for receiving a user message in a communication network are disclosed. In an exemplary embodiment, a method includes receiving data samples in an uplink transmission from user equipment, performing preamble detection on the data samples, generating a trigger signal that indicates when a preamble is detected, and decoding a user message in response to the trigger signal, wherein the user message follows the detected preamble.

20 Claims, 7 Drawing Sheets

METHODS AND APPARATUS FOR RECEIVING A USER MESSAGE IN A COMMUNICATION NETWORK

CROSS-REFERENCE TO RELATED APPLICATIONS

This application claims the benefit under 35 U.S.C. § 119 of U.S. Provisional Patent Application No. 63/027,832 filed on May 20, 2020 and entitled "METHOD AND APPARATUS FOR RECEIVING INITIAL USER MESSAGE WITH EXCESSIVE DELAY IN 5G NR," which is incorporated by reference herein in its entirety.

FIELD

The exemplary embodiments of the present invention relate to telecommunications network. More specifically, the exemplary embodiments of the present invention relate to receiving and processing data streams via a wireless communication network.

BACKGROUND

High speed communication networks, such as fourth generation (4G) long term evolution (LTE) and fifth generation (5G) new radio (NR) networks are becoming increasing utilized to communicate data between user equipment. To communicate over these networks, a user equipment first needs to acquire access privileges. In 4G LTE/5G NR systems, multiple format access preambles are transmitted in uplink transmissions from user equipment to obtain access privileges from the network. Each access preamble format has its own sample rate and bandwidth. Typically, a base station receiver needs many instances of a preamble detector, which are simultaneously running at each carrier frequency to detect the received preambles.

To obtain access privileges, a user equipment (UE) transmits a PRACH (Physical Random Access Channel) preamble that is received by a base station. The base station detects the preamble, and sends a response to the user equipment. If the user equipment does not receive the response, the procedure is repeated by the user equipment, which ramps up its transmit power until a maximum number of trials are reached. As soon as the user equipment gets the response (RAR: random access response) from the base station, the user equipment sends a use message to attach itself to the network. When the base station receives this user message from the UE, the base station sends the basic information/parameters that enable the user equipment to access the network. Thus, it is desirable to have a system that operates more efficiently to receive a user message at a network base station.

SUMMARY

In various exemplary embodiments, methods and apparatus are disclosed for receiving a user message in a communication network. In an embodiment, a user equipment transmits a preamble over an uplink communication channel to a network base station. The user equipment also transmits a user message directly after the preamble. Once the preamble is detected at the base station, the message following the preamble can be quickly decoded. The base station then transmits network parameters to the user equipment to establish network access. Thus, the base station is able to receive and decode the user message right after the preamble is detected without having to transmit an acknowledgment to the user equipment that the preamble was received. As a result, the base station is able to receive and process the initial user message without excessive delay or network performance degradation.

In an exemplary embodiment, a method is provided that includes receiving data samples in an uplink transmission from user equipment, performing preamble detection on the data samples, generating a trigger signal that indicates when a preamble is detected, and decoding a user message in response to the trigger signal, wherein the user message follows the detected preamble.

In an embodiment, apparatus is provided for message detection in a communication network. The apparatus comprises a preamble detector configured to receive data samples in an uplink transmission from user equipment and perform preamble detection on the data samples to generate a time delay estimate of a detected preamble. The apparatus also comprises an uplink receiver controller configured to generate a trigger signal from the time delay estimate, wherein the trigger signal indicates when the detected preamble is detected. The apparatus also comprises an uplink shared channel receiver configured to decode a user message from the data samples in response to the trigger signal, wherein the user message is received in the uplink transmission after the detected preamble.

In an exemplary embodiment, apparatus is provided that comprises a processor and a memory configured to perform operations of: receiving data samples in an uplink transmission from user equipment; performing preamble detection on the data samples; generating a trigger signal that indicates when a preamble is detected; and decoding a user message in response to the trigger signal, wherein the user message follows the detected preamble.

Additional features and benefits of the exemplary embodiments of the present invention will become apparent from the detailed description, figures and claims set forth below.

BRIEF DESCRIPTION OF THE DRAWINGS

The exemplary aspects of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
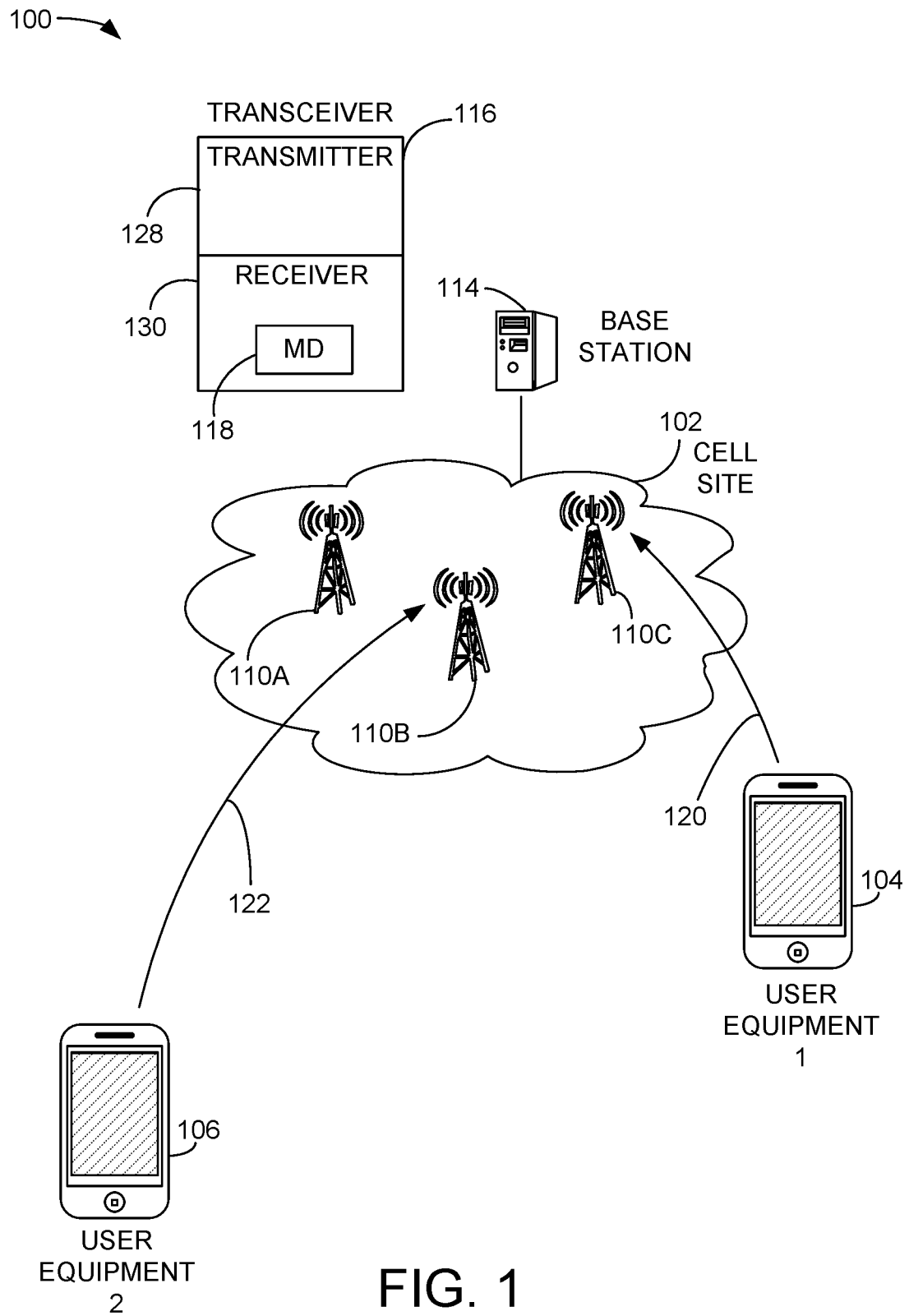
FIG. 1 shows a communication network comprising a transceiver having an exemplary embodiment of a message detector configured for accurate detection of user messages associated with preambles received in uplink communications.

In various exemplary embodiments, methods and apparatus for receiving a user message in a communication network are disclosed.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It is understood that in the development of any such actual implementation, numerous implementation-specific decisions may be made in order to achieve the developer's specific goals, such as compliance with application and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of the embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

FIG. 1 shows a communication network comprising a transceiver 116 having an exemplary embodiment of a message detector 118 configured for accurate detection of user messages associated with preambles received in uplink communications. The communication network 100 includes a base station 114 that includes the transceiver 116. The transceiver 116 has a transmitter portion 128 and a receiver portion 130. The base station 114 is configured to communicate with radio towers 110A-C located in cell site 102. In various embodiments, the communication network 100 comprises a 4G LTE or 5G NR communication network. Aspects of the invention are also suitable for use with other types of communication networks.

User equipment 1 (UE1) 104 transmits uplink communications 120 to the base station 114 through tower 110c, and user equipment 2 (UE2) 106 transmits uplink communications 122 to the base station 114 through tower 110b. For example, the UEs can be cellular phones, handheld devices, tablet computers or iPad® devices or any other suitable communication devices. It should be noted that the underlying concepts of the exemplary embodiments of the present invention would not change if one or more blocks (or devices) were added or removed from the communication network 100.

The base station needs to receive initial message from the user device which is not fully synchronized with the base station. To improve the random access, a two-step process is used. For example, the user equipment transmits its preamble and then it transmits its user message directly after the preamble to attach itself to the network faster by not waiting for the random access response from the base station. When the base station detects the preamble, it gets ready to receive the user message that follows the preamble. When the base station successfully demodulates the user message, it transmits the basic information and/or parameter sets to the user equipment to establish network access. More detailed descriptions of the implementation and operation of the MD 118 are provided below.

Figure 2:
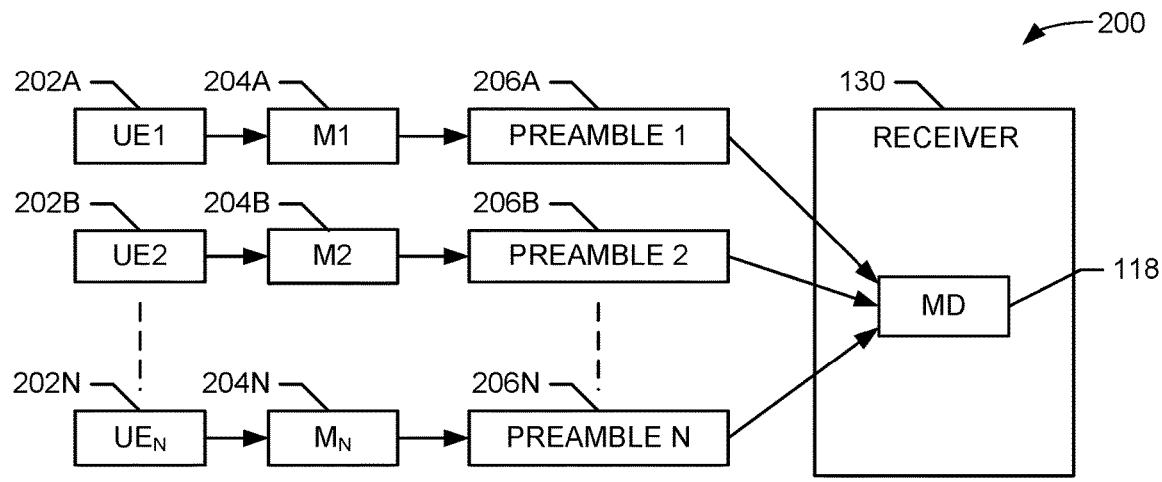
FIG. 2 shows an exemplary functional block diagram of the communication network shown in FIG. 1.

FIG. 2 shows an exemplary functional block diagram 200 of the communication network 100 shown in FIG. 1. Each user equipment 202A-N transmits signals to the receiver 130 through an uplink transmission. To access the network, each user equipment 202A-N transmits an access preamble 206A-N followed by a user message 204A-N, respectively. In an embodiment, the two-step process is used to improve random access to a communication network.

In the two step approach, a user equipment, such as UE1 202A, transmits its preamble 206A and its user message 204A directly after to attach itself to the network without having to wait for the random access response from the base station receiver 130. When the MD 118 at the base station receiver 130 detects the preamble, it gets ready to receive the user message 204A that follows the preamble 206A. When the MD 118 successfully demodulates the message 204A, it initiates the transmission of basic information and/or parameter sets to the user equipment 202A to establish network access.

Figure 3:
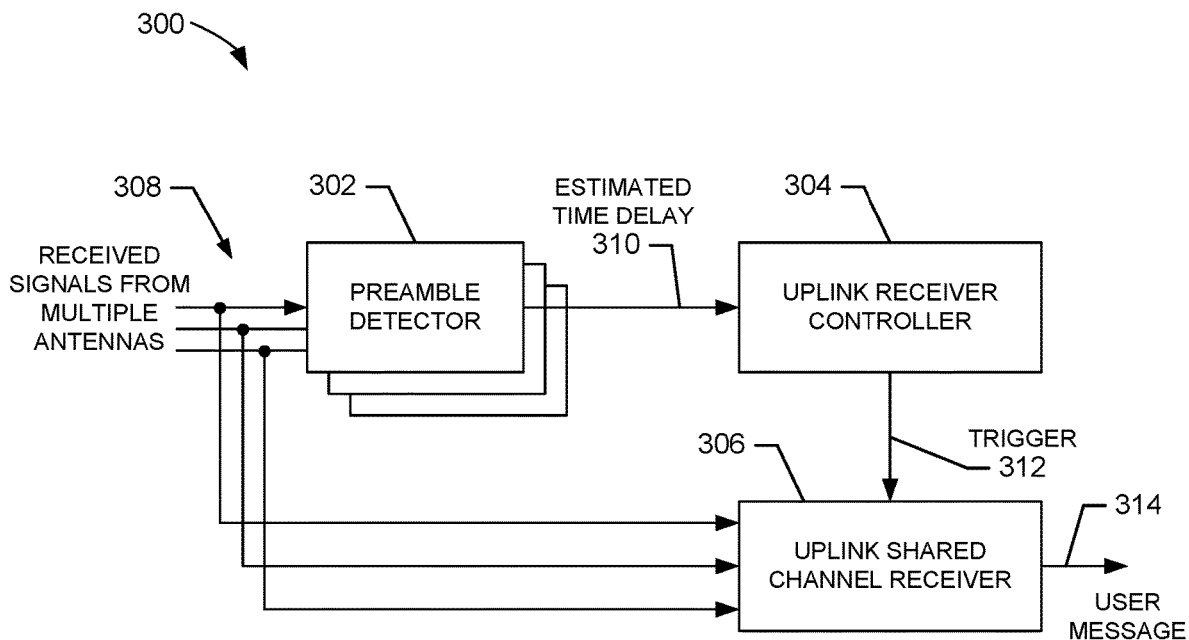
FIG. 3 shows an exemplary embodiment of a message detector.

FIG. 3 shows an exemplary embodiment of a message detector 300. The MD 300 is suitable for use as the MD 118 shown in FIG. 1. In an embodiment, the MD 300 comprises preamble detector 302, uplink receiver controller 304, and uplink shared channel receiver 306.

Preamble Detector 302

In an embodiment, the preamble detector 302 comprises at least one component selected from a set that includes a state machine, processor, CPU, programmable gate array, RAM, ROM, memory, programmable logic, discrete logic devices, and discrete analog devices. During operation, when a UE wants to establish access with a communication network, the UE transmits a PRACH (physical random access channel) preamble over an uplink channel. The preamble detector 302 processes a selectable amount of received signal samples 308 from one or more UEs. The preamble detector 302 detects the preamble transmitted by a user within a certain time window. The base station should have multiple preamble detection blocks to cover a large time window, since the UEs that are not attached to the network might not have accurate internal time synchronization.

In an exemplary embodiment, the preamble detector 302 comprises the following components that are not shown in FIG. 3.

1. Decimator circuit that operates to lower the sample rate of the received samples, which is important for reception of the preamble.

2. FFT circuit that transforms time-domain sequences into frequency domain sequences.

3. A frequency domain preamble sequence generator/correlator that reduces the receiver complexity. In an embodiment, the time domain correlator is implemented with an FFT and a frequency domain sequence generator/multiplier.

4. IFFT circuit that transforms the frequency domain correlation results into the time domain.

5. Preamble profiler that uses the squares of IFFT results to reports the received preamble signal power vs. time to the software.

In an embodiment, the preamble detector 302 determines an estimated time delay 310 associated with a detected preamble. This estimated time delay 310 is input to the uplink receiver controller 304.

Uplink Receiver Controller 304

In an embodiment, the uplink receiver controller 304 comprises at least one component selected from a set that includes a state machine, processor, CPU, programmable gate array, RAM, ROM, memory, programmable logic, discrete logic devices, and discrete analog devices. When the preamble detector reports the time-domain profile over the time window of each preamble detector, a determination is made as to whether the receiver should demodulate a following user message based on the associated preamble signature and its received signal level. If it is determined to receive the user message (e.g, MSG3) following the preamble, a trigger signal 312 is generated to trigger the uplink shared channel receiver 306 with the detected time position to achieve the best receiver performance.

Conventional Message Processing

In a conventional random access procedure to establish network access for user equipment (UE), the following message sequence is performed.

1. A UE transmits a PRACH preamble message (MSG1). This preamble message is very primitive and carries only a random identifier.

2. When the base station detects the preamble message (MSG1), it sends an acknowledgement message (MSG2) (a RAR: random access response).

3. When the UE receives the RAR message (MSG2), it transmits the connection request message (MSG3) (carrying very detailed information about itself).

4. When the base station detects MSG3 (connection request message), it resolves the contention by sending (MSG4) to the UE.

Novel Message Processing

In a random access procedure in accordance with embodiments of the invention, a UE establishes network access utilizing the following message sequence.

1. A UE transmits MSG1 followed by MSG3

2. When the base station detects only MSG1, it sends MSG2. However, if the base station detects MSG1+MSG3, then it sends MSG4. For example, when MSG1+MSG3 have been received, the controller 304 notifies higher layers that MSG3 was received and passes MSG3 to the higher layers (e.g., another network equipment or software). When receiving a response from the higher layer, controller 304 makes the scheduler prepare to send the MSG4 transmission to the UE.

3. When the UE receives MSG2, it sends MSG3. However, if the UE receives MSG4, the UE can presume that initial setup for network access is completed.

In various embodiments of the novel messaging procedure, the generated "trigger signal" is a signal that triggers the data channel demodulation resource, since when the preamble is detected, the base station prepares the data channel demodulation resource for receiving the MSG3 message transmitted from the UE just after the preamble.

Trigger Signal

In various embodiments, the trigger signal is used to trigger the following operations.

1. Allocate the PUSCH (=normal data channel) receiver resource, and executes its receiving process.

2. When transmitting the PRACH preamble, the UE may not be aware of the distance (e.g., time delay) to the base station, so that the transmitted user preamble+MSG3 might be received outside of the receiver time window. In this case, due to the potential of interference from adjacent channels, the base station operates to prepare the demodulating resource for demodulating the MSG3 if it is received outside of the time window region. In accordance with the embodiments of the invention, in response to the trigger signal, the base station controls the demodulating resource to reuse the filter resource used for PRACH detection for MSG3 detection as well. In this case, the operation of the base station is controlled to result in the following benefits.

1) The (decimation filter) resource is saved and dedicated to the MSG3 detection.

2) The reused filter resource works as the interference rejection filter.

3) The decimated data samples require a smaller resource for MSG3 detection (e.g., don't need a large receiver resource as for a normal data channel).

Uplink Shared Channel Receiver 306

In an embodiment, the uplink channel receiver 306 comprises at least one component selected from a set that includes a state machine, processor, CPU, programmable gate array, RAM, ROM, memory, programmable logic, discrete logic devices, and discrete analog devices. The uplink shared channel receiver 306 performs user message decoding. During operation, the uplink shared channel receiver 306 is triggered by the trigger signal 312 whenever it is detected that a possible user message (E.G., MSG3) follows after a detected preamble. More detailed descriptions of the implementation and operation of the uplink shared channel receiver 306 are provided with respect to FIG. 4.

Figure 4:
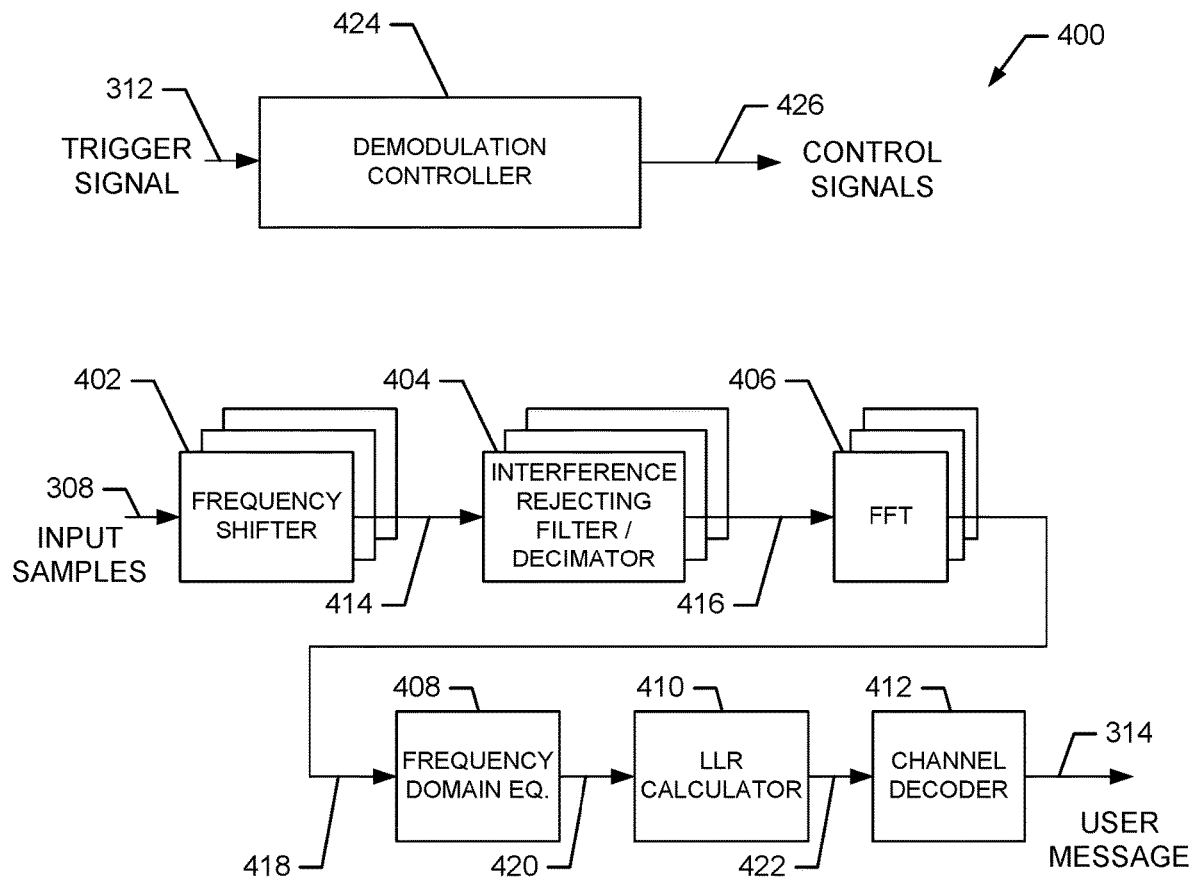
FIG. 4 shows an exemplary detailed embodiment of a message detector.

FIG. 4 shows an exemplary embodiment of an uplink shared channel receiver 400. The uplink shared channel receiver 400 is suitable for use as the uplink shared channel receiver 306 shown in FIG. 3. In an embodiment, the uplink shared channel receiver 400 comprises frequency shifter 402, interference rejection filter/decimator 404, FFT circuit 406, frequency domain equalizer (EQ) 408, log-likelihood ration (LLR) calculator 410, and channel decoder 412. In an embodiment, the uplink shared channel receiver 400 comprises a demodulation controller 424 that generates control signal 426 that control the operation of the circuits of the uplink shared channel receiver 400. In an embodiment, when the trigger signal 312 is received by the controller 424, the controller 424 generates the control signals 426 to control the circuits of the uplink shared channel receiver 400 to decode a user message (e.g., MSG3) as described herein.

Frequency Shifter 402

In an embodiment, the frequency shifter 402 comprises at least one component selected from a set that includes a state machine, processor, CPU, programmable gate array, RAM, ROM, memory, programmable logic, discrete logic devices, and discrete analog devices. During operation, the user message is received within a certain frequency band. The frequency shifter 402 tunes the uplink shared channel receiver 400 to that frequency band. Thus, the input samples 308 are frequency shifted to generate frequency shifted samples 414.

Interference Rejection Filter/Decimator 404

In an embodiment, the interference rejection filter/decimator 404 comprises at least one component selected from a set that includes a state machine, processor, CPU, programmable gate array, RAM, ROM, memory, programmable logic, discrete logic devices, and discrete analog devices. During operation, the user message is received with a smaller signal bandwidth around the identified frequency band. Other signals that the base station receives out of that bandwidth are interfering signals, so the interference rejection filter/decimator 404 rejects/filters all those interfering signals and lowers the sample rate for the user message reception, which may also reduce or minimize hardware requirements. Thus, the interference rejection filter/decimator 404 processes the frequency shifted samples 414 to generate filtered samples 416.

FFT Circuit 406

In an embodiment, the FFT circuit 406 comprises at least one component selected from a set that includes a state machine, processor, CPU, programmable gate array, RAM, ROM, memory, programmable logic, discrete logic devices, and discrete analog devices. During operation, the FFT circuit 406 transforms the received time domain filtered samples 416 to frequency domain samples 418 that are used to decode the user message.

Frequency Domain Equalizer 408

In an embodiment, the frequency domain EQ 408 comprises at least one component selected from a set that includes a state machine, processor, CPU, programmable gate array, RAM, ROM, memory, programmable logic, discrete logic devices, and discrete analog devices. During operation, the frequency domain EQ 408 compensates for the signal distortion imposed by the wireless channel. Thus, the frequency domain samples 418 are equalized to generate equalizes samples 420.

LLR Calculator 410

In an embodiment, the LLR calculator 410 comprises at least one component selected from a set that includes a state machine, processor, CPU, programmable gate array, RAM, ROM, memory, programmable logic, discrete logic devices, and discrete analog devices. The LLR calculator 410 calculates a channel decoder input signal 422 from the demodulated and frequency-equalized samples 420. The LLR indicates the likelihood (how close the received signal is to the expected signal) in log scale.

Channel Decoder 412

In an embodiment, the channel decoder 412 comprises at least one component selected from a set that includes a state machine, processor, CPU, programmable gate array, RAM, ROM, memory, programmable logic, discrete logic devices, and discrete analog devices. The channel decoder 412 decodes the channel decoder input signal 422 and restores the user message 314.

In an embodiment, the uplink shared channel receiver 306 performs at least the following operations to decode a user message (MSG3) from received uplink samples.

1. Frequency shifts the uplink samples to tune the uplink shared channel receiver 400 to a selected frequency band to generate frequency shifted samples 414.
2. Remove or reject interference from the frequency shifted samples to generate filtered samples 416.
3. Convert the filtered samples 416 to frequency domain samples 418.
4. Perform frequency domain equalization on the frequency domain samples 418 to generate equalized samples 420.
5. Perform an LLR calculation on the equalized samples 420 to generate a channel decoder input signal 422.
6. Decode the channel decoder input signal 422 to obtain the user message 314. For example, the UE message MSG3 is decoded.

Thus, the uplink shared channel receiver 400 operates to receive data samples in an uplink transmission and detect a user message (MSG3) as described above.

Figure 5:
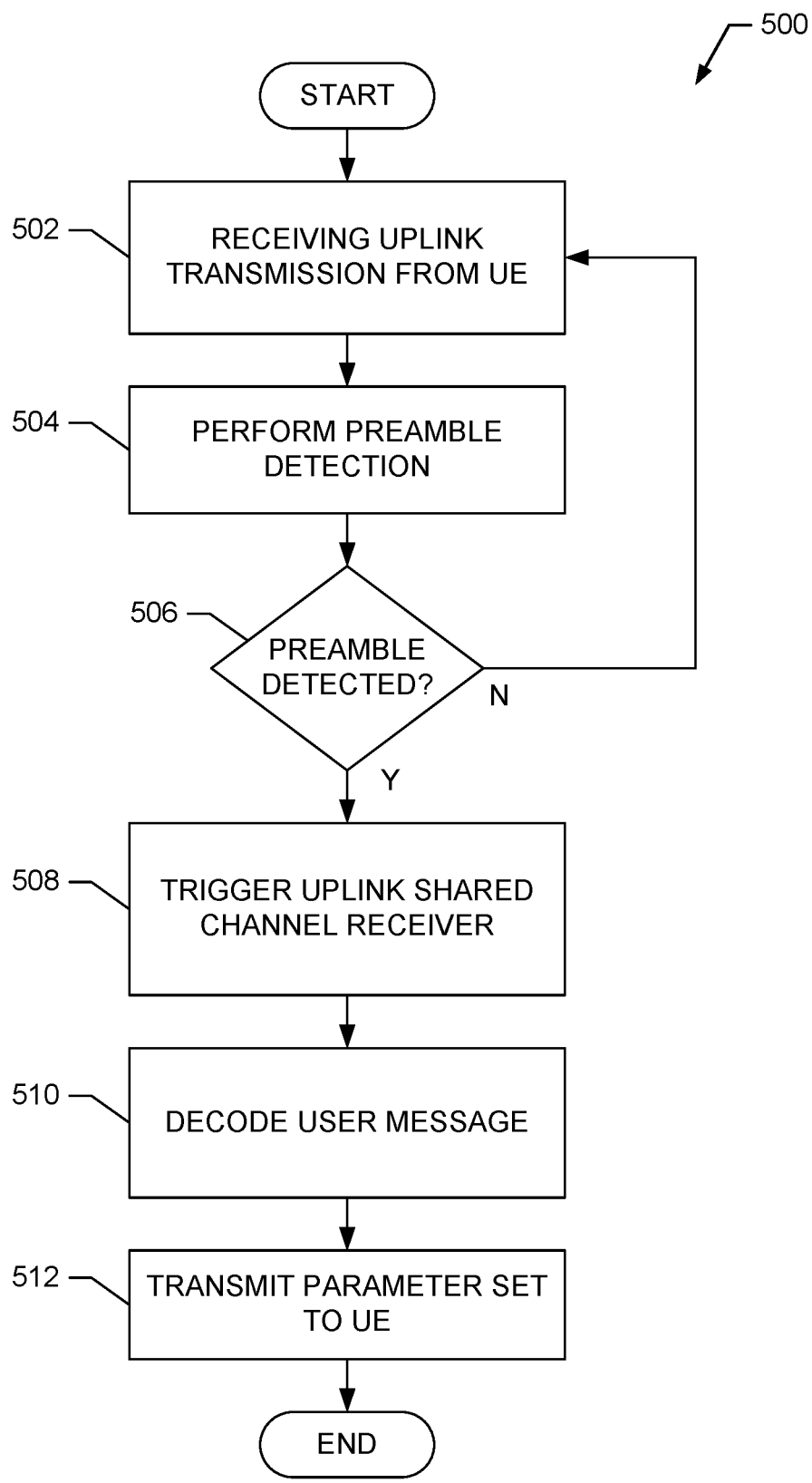
FIG. 5 shows an exemplary method for message detection in accordance with one embodiment of the present invention.

FIG. 5 shows an exemplary method 500 for detecting a user message received in an uplink transmission in accordance with one embodiment of the present invention. For example, in an exemplary embodiment, the method 500 is performed by the MD 118 shown in FIG. 1, the MD 300 shown in FIG. 3, or the MD 700 shown in FIG. 7.

At block 502, uplink transmissions are received at a receiver from one or more user equipment. For example, the uplink transmissions include preamble data that are used to obtain network services for each UE.

At block 504, a preamble detection process is performed. For example, the preamble detector 302 performs this operation.

At block 506, a determination is made as to whether a preamble is detected. For example, the preamble detector 302 performs this operation and outputs the estimated time delay signal 310 to the uplink receiver controller 304 when a preamble is detected.

At block 508, a trigger signal is generated to indicate that the preamble was detected within a certain time interval. For example, the uplink receiver controller 304 generates the trigger signal 312 to indicate that a preamble was detected.

At block 510, a user message is decoded. For example, the uplink shared channel receiver 306 decodes the user message (MSG3) from the received uplink transmission. In an embodiment, the uplink shared channel receiver 400 is used to perform this operation.

At block 512, a parameter set is transmitted to the user equipment. For example, the processor 702 transmits parameters 716 after the user message (MSG3) is successfully decoded.

Thus, the method 500 operates to receive and decode a user message received in an uplink transmission. It should be noted that the method 500 is exemplary and that the operations may be rearranged, added to, deleted, combined, or otherwise modified within the scope of the embodiments.

Figure 6:
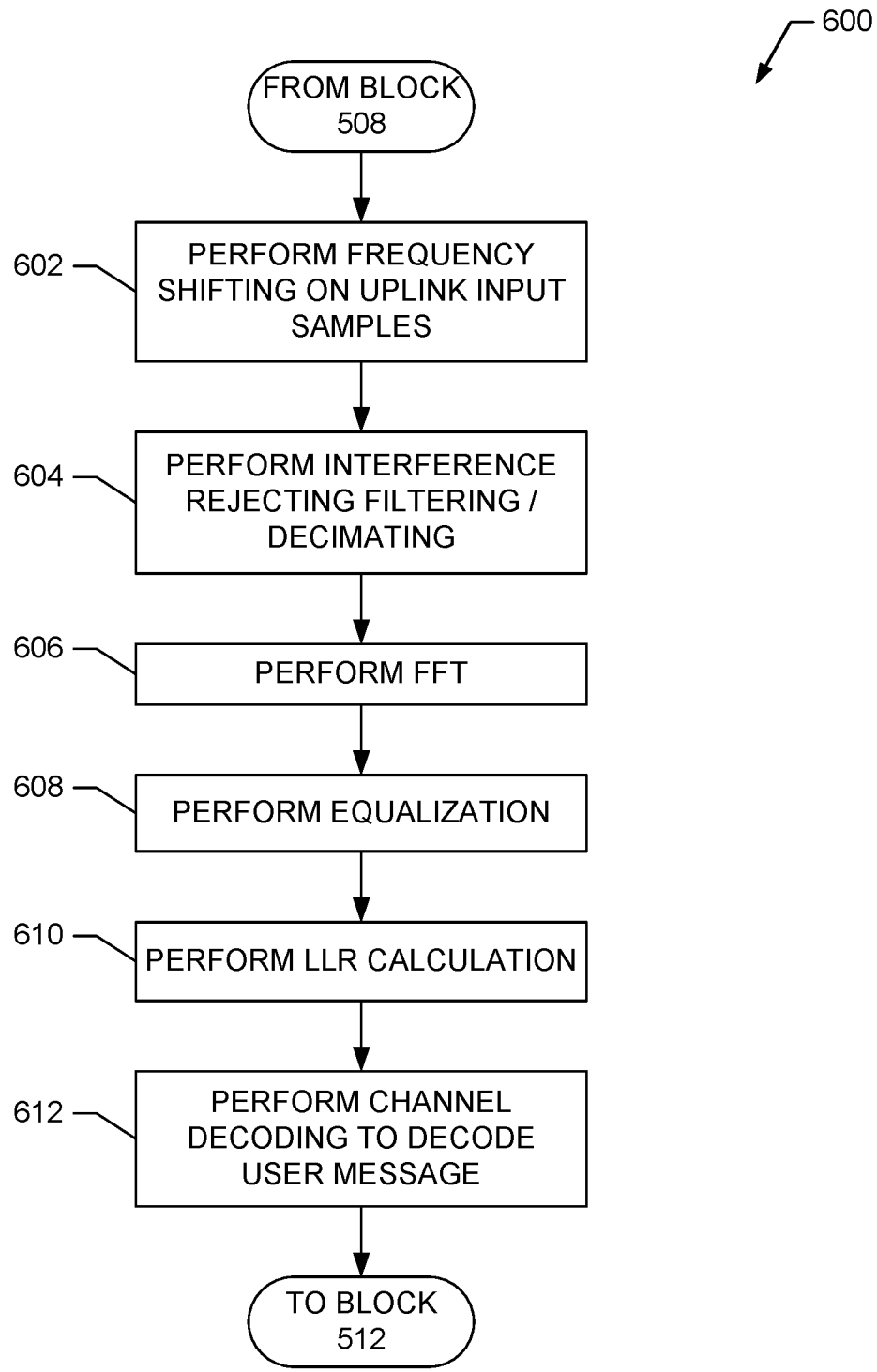
FIG. 6 shows an exemplary method for decoding a user message for use in the method shown in FIG. 5.

FIG. 6 shows an exemplary method 600 for decoding a user message received in an uplink transmission in accordance with one embodiment of the present invention. For example, the method 600 is suitable for use to perform the decoding operation at block 510 shown in FIG. 5.

At block 602, the received uplink samples are frequency shifted to tune the uplink shared channel receiver 400 to a selected frequency band. For example, the uplink transmissions include preamble data that are used to obtain network services for each UE. For example, the frequency shifter 402 performs this operation to generate the frequency shifted samples 414.

At block 604, interference from the frequency shifted samples is removed or rejected. For example, the interference rejecting filter/decimator 404 performs this operation to generate the filtered samples 416.

At block 606, the filtered samples are converted to frequency domain samples. For example, the FFT circuit 406 receives the filtered samples 416 and generates the frequency domain samples 418.

At block 608, frequency domain equalization is performed on the frequency domain samples. For example, the equalization circuit 408 performs equalization on the frequency domain samples 418 to generate equalized samples 420.

At block 610, an LLR calculation is performed to generate a decoder input signal. For example, the LLR calculator 410 performs an LLR calculation on the equalized samples 420 to generate the decoder input signal 422.

At block 612, the decoder input signal is decoded to obtain the user message (MSG3). For example, the channel decoder 412 decodes the input signal 422 to generate the user message (MSG3) 314.

Thus, the method 600 operates to decode a user message (MSG3) received in an uplink transmission. It should be noted that the method 600 is exemplary and that the operations may be rearranged, added to, deleted, combined, or otherwise modified within the scope of the embodiments.

Figure 7:
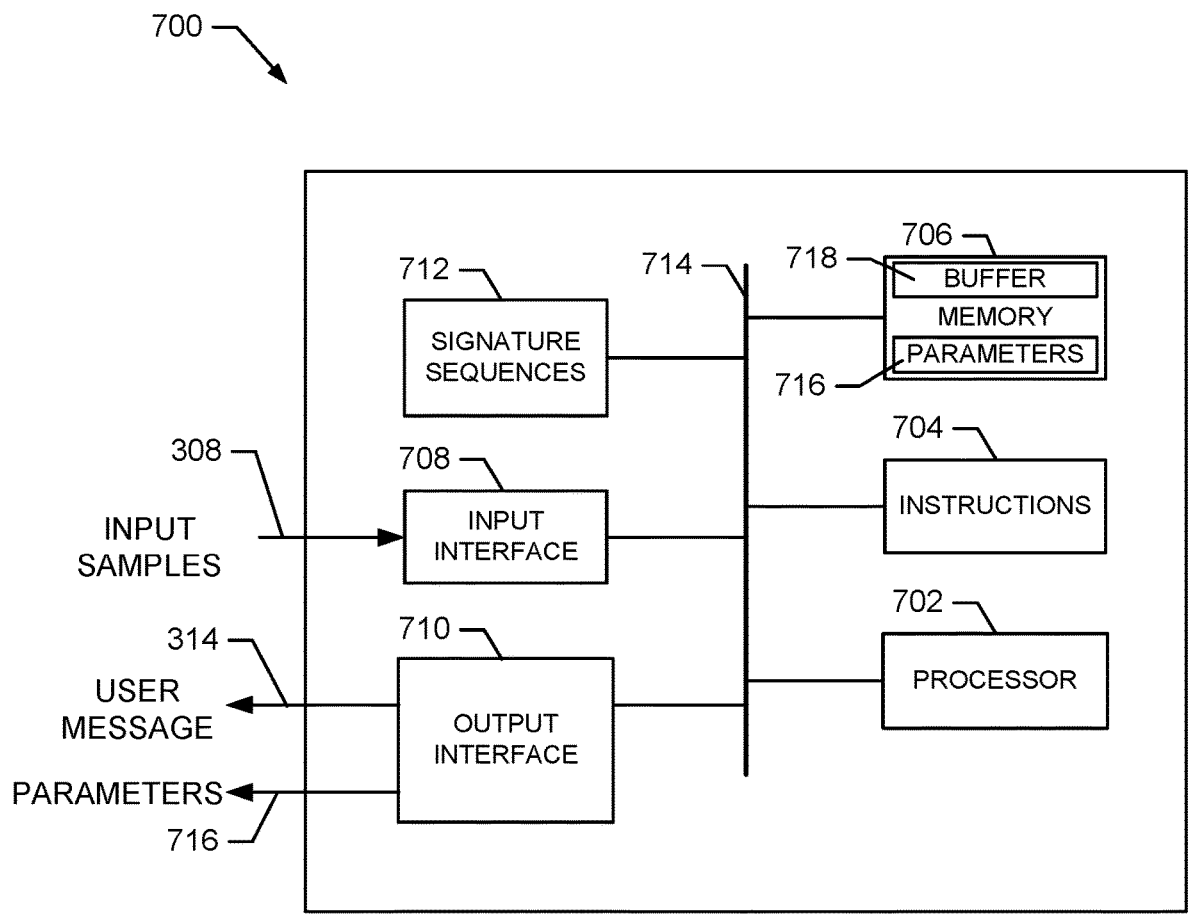
FIG. 7 shows an exemplary embodiment of a message detector.

FIG. 7 shows an exemplary embodiment of a message detector 700. For example, the message detector 700 is suitable for use as the message detector 118 shown in FIG. 1. In an embodiment, the message detector 700 comprises processor 702, instructions 704, memory 706, input interface 708, output interface 710, and signature sequences 712, all coupled to communicate over bus 714. In an embodiment, the memory 706 comprises parameter database 716 and data buffer 718.

In an embodiment, input data samples 308 received in uplink transmissions from user equipment are received by the input interface 708. The input interface 708 buffers the received preamble data in the buffer 718 for processing by the processor 702.

In an embodiment, the processor 702 executes the instructions 704 to perform a user message detection function as described herein. For example, the processor 702 performs at least the following operations.

1. Buffer received uplink data 308 in the buffer 718.
2. Perform a preamble detection process on the received uplink data 308. For example, the processor 702 performs preamble detection similar to the preamble detector 302 shown in FIG. 3.
3. Determine when a preamble is detected in the input samples. For example, the processor 702 matches the received preamble signals with the signature sequences 712 to determine when a preamble is detected.
4. Generate a trigger signal that indicates that a preamble was detected within a certain time interval. For example, the processor 702 generates an internal trigger signal when the preamble is detected.
5. Decode a user message that follows the detected preamble. For example, the processor 702 decodes the received input samples 308 similar to the message decoder 400 to decode the user message (MSG3).
6. Transmit parameters to user equipment. For example, after a user message (MSG3) is decoded, the processor 702 transmits the parameters 716 to the UE through the output interface 710.

Thus, the message detector 700 operates to receive preamble data in uplink transmissions and decode a user message transmitted from user equipment.

Figure 8:
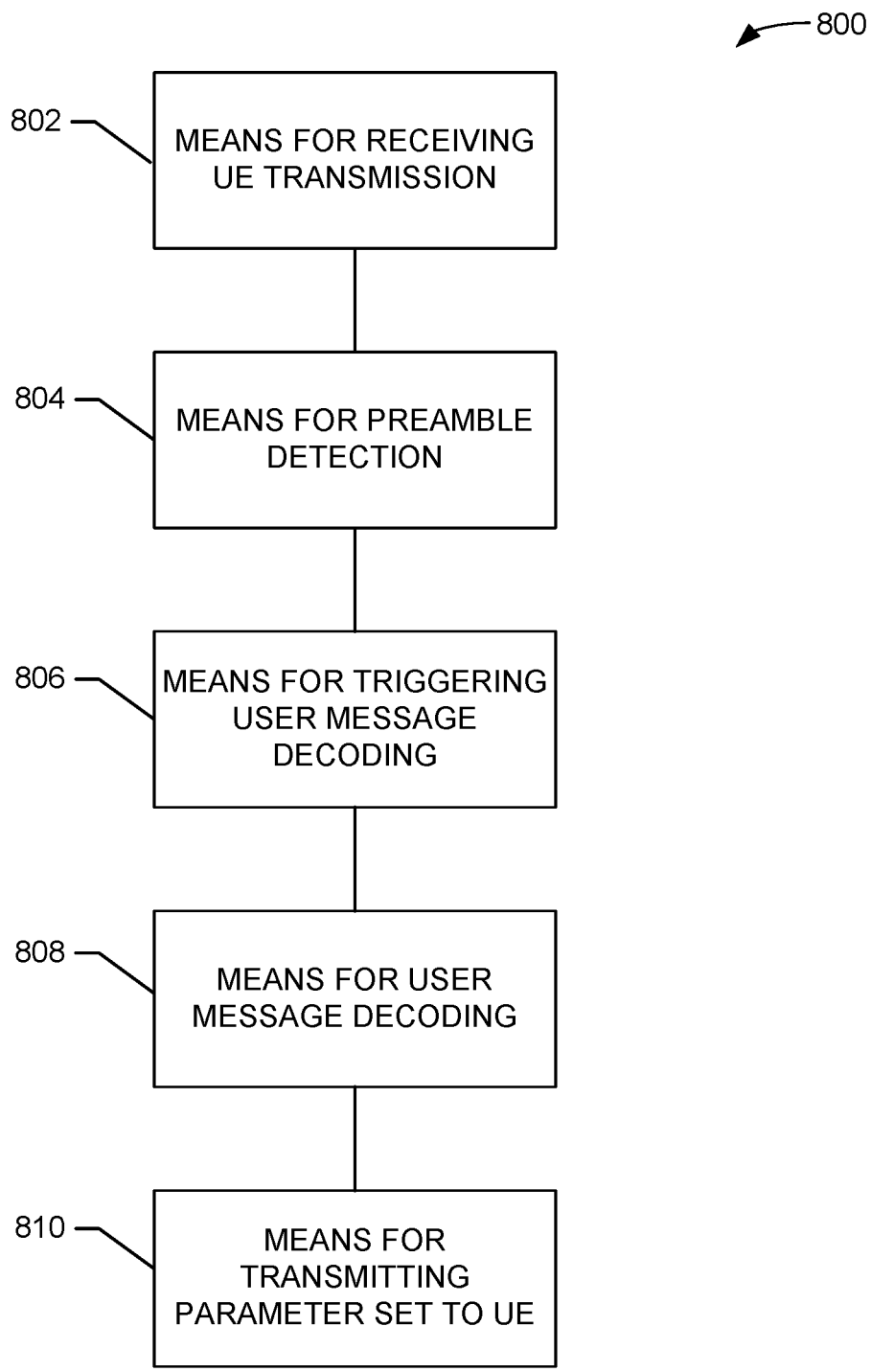
FIG. 8 shows an exemplary embodiment of a message detector.

FIG. 8 shows an exemplary embodiment of a message detector 800. For example, the message detector 800 is suitable for use as the message detector 118 shown in FIG. 1. In an embodiment, the message detector 800 comprises means 802 for buffering received uplink data, which in an embodiment comprises the memory 706. The message detector 800 also comprises means 804 for performing preamble detection process, which in an embodiment comprises the preamble detector 302. The message detector 800 also comprises means 806 for determining when a preamble is detected, which in an embodiment comprises the preamble detector 302. The message detector 800 also comprises means 808 for triggering an indicator that indicates that the preamble was detected within a certain time interval, which in an embodiment comprises the uplink receiver controller 304. The message detector 800 also comprises means 810 for decoding a user message that follows the detected preamble, which in an embodiment comprises the uplink shared channel receiver 306. The message detector 800 also comprises means 812 for transmitting parameters to user equipment, which in an embodiment comprises the processor 702.

While particular embodiments of the present invention have been shown and described, it will be obvious to those skilled in the art that, based upon the teachings herein, changes and modifications may be made without departing from this exemplary embodiments of the present invention and its broader aspects. Therefore, the appended claims are intended to encompass within their scope all such changes and modifications as are within the true spirit and scope of these exemplary embodiments.

What is claimed is:

1. A method for message detection in a communication network, the method comprising:
   receiving data samples in an uplink transmission from a user equipment;
   performing preamble detection on the data samples to generate an estimated time delay associated with a detected preamble;
   generating a trigger signal based on the estimated time delay when the detected preamble is detected;
   shifting, by a frequency shifter of an uplink shared channel receiver, the data samples to generate frequency shifted samples; and
   generating, by a channel decoder of the uplink shared channel receiver, a user message in response to the frequency shifted samples and the trigger signal, wherein the user message is received via the uplink transmission after the detected preamble.

2. The method of claim 1, further comprising transmitting network parameters to the user equipment after the user message is decoded.

3. The method of claim 1, further comprising removing, by an interference rejection circuit of the uplink shared channel receiver, interference from the frequency shifted samples to generate filtered samples.

4. The method of claim 3, further comprising transforming, by a frequency transform circuit of the uplink shared channel receiver, the filtered samples to a frequency domain to generate frequency domain samples.

5. The method of claim 4, further comprising equalizing, by an equalization circuit of the uplink shared channel receiver, the frequency domain samples to generate equalized samples.

6. The method of claim 5, further comprising performing, by a log-likelihood ratio (LLR) calculator of the uplink shared channel receiver, an LLR calculation of the equalized samples to generate LLR samples.

7. The method of claim 6, wherein the generating the user message comprises decoding, by the channel decoder of the uplink shared channel receiver, the LLR samples to generate the user message.

8. An apparatus for message detection in a communication network, the apparatus comprising:
   a preamble detector configured to receive data samples in an uplink transmission from a user equipment and perform preamble detection on the data samples to generate a time delay estimate of a detected preamble;

an uplink receiver controller configured to generate a trigger signal from the time delay estimate, wherein the trigger signal indicates when the detected preamble is detected; and an uplink shared channel receiver including a frequency shifter that frequency shifts the data samples to generate frequency shifted samples, wherein the uplink shared channel receiver is configured to decode a user message from the data frequency shifted samples in response to the trigger signal, and wherein the user message is received in the uplink transmission after the detected preamble.

9. The apparatus of claim 8, further comprising a processor configured to transmit network parameters to the user equipment after the user message is decoded.

10. The apparatus of claim 8, wherein the uplink shared channel receiver further comprises an interference rejection circuit configured to remove interference from the frequency shifted samples to generate filtered samples.

11. The apparatus of claim 10, wherein the uplink shared channel receiver further comprises a frequency transform circuit configured to transform the filtered samples to a frequency domain to generate frequency domain samples.

12. The apparatus of claim 11, wherein the uplink shared channel receiver further comprises an equalization circuit configured to equalize the frequency domain samples to generate equalized samples.

13. The apparatus of claim 12, wherein the uplink shared channel receiver further comprises a log-likelihood ratio (LLR) calculator configured to calculate LLR samples from the equalized samples.

14. The apparatus of claim 13, wherein the uplink shared channel receiver further comprises a decoder circuit configured to decode the LLR samples to generate the user message.

15. A receiver configured for message detection in a communication network, the receiver comprising:
a preamble detector configured to receive data samples in an uplink transmission from a user equipment and perform preamble detection on the data samples to generate a time delay estimate of a detected preamble;
an uplink receiver controller coupled to the preamble detector and configured to generate a trigger signal based on the time delay estimate, wherein the trigger signal indicates when the detected preamble is detected; and
an uplink shared channel receiver coupled to the uplink receiver controller, wherein the uplink shared channel receiver includes a frequency shifter and a channel decoder, wherein the frequency shifter shifts the data samples to generate frequency shifted samples, wherein the channel decoder decodes a user message from the frequency shifted samples in response to the trigger signal, and wherein the frequency shifter is configured to tune a frequency band associated to the uplink shared channel receiver for subsequent receipt of data transmission.

16. The receiver of claim 15, wherein the communication network comprises at least one of a 4G and 5G communication network.

17. An apparatus for message detection in a communication network, the apparatus comprising:
a memory; and
a processor coupled to the memory and configured to perform operations of:
receiving data samples in an uplink transmission from a user equipment;
performing preamble detection on the data samples to generate a time delay estimate of a detected preamble;
generating a trigger signal based on the time delay estimate that indicates when the detected preamble is detected;
shifting, by an uplink shared channel receiver, the data samples to generate frequency shifted samples; and
generating, by the uplink shared channel receiver, a user message in response to the frequency shifted samples and the trigger signal, wherein the user message is received via the uplink transmission after the detected preamble.

18. An apparatus for message detection, the apparatus comprising:
means for receiving data samples in an uplink transmission from a user equipment and for performing preamble detection on the data samples to generate an estimated time delay associated to a detected preamble;
means for generating a trigger signal from the estimated time delay when the detected preamble is detected;
means for shifting the data samples to generate frequency shifted samples; and
means for generating a user message in response to the frequency shifted samples and the trigger signal, wherein the user message is received via the uplink transmission after the detected preamble.

19. The apparatus of claim 18, further comprising means for transmitting network parameters to the user equipment after the user message is generated.

20. The apparatus of claim 18, further comprising means for removing interference from the frequency shifted samples to generate filtered samples, wherein the means for generating the user message is response to the filtered samples and the trigger signal.

* * * * *